United States Patent [19]

Rogers

[11] 4,100,485

[45] Jul. 11, 1978

[54] PHASE DISPLACED MEASUREMENT OF CONTIGUOUS SPHERICAL BALLS

[75] Inventor: Michael James Rogers, Peterborough, England

[73] Assignee: The Newall Engineering Company Ltd., England

[21] Appl. No.: 709,086

[22] Filed: Jul. 27, 1976

[30] Foreign Application Priority Data

Feb. 17, 1976 [GB] United Kingdom ............... 6258/76

[51] Int. Cl.² ........................................... G01R 33/00
[52] U.S. Cl. ..................................... 324/208; 340/196; 324/200
[58] Field of Search .................... 340/199, 282, 196; 324/34 R, 34 PS, 34 D, 34 T, 179, 167, 83 FM; 29/724, 725

[56] References Cited

U.S. PATENT DOCUMENTS

| | | | |
|---|---|---|---|
| 1,103,358 | 7/1914 | Hess | 324/34 R |
| 1,797,864 | 3/1931 | Harlandt | 324/34 R |
| 3,018,437 | 1/1962 | Dudley | 324/34 R |
| 3,147,574 | 9/1964 | La Pointe et al. | 324/34 PS |
| 3,242,472 | 3/1966 | Anthony | 340/196 |
| 3,456,132 | 7/1969 | Dechelotte | 324/34 R |
| 3,488,578 | 1/1970 | Stigmark | 324/34 R |

Primary Examiner—Rudolph V. Rolinec
Assistant Examiner—Michael J. Tokar
Attorney, Agent, or Firm—Mawhinney & Mawhinney & Connors

[57] ABSTRACT

A detector for measuring relative movement and/or displacement between two relatively movable members comprises a plurality of regularly shaped elements of magnetic material e.g. steel balls, periodically spaced along a path which is preferably linear, and a transducer which is movable relative to the elements in a direction parallel to said path. The transducer comprises a transmitter coil, or series of coils, disposed for producing a magnetic field parallel to said path, and at least two pick-up coils encasing the path and displaced along it. The pick-up coils sense the variation in the magnetic field due to the presence of the elements, so that the relative spacing of the pickup coils and the elements enable, on the production of the magnetic field, the generation by the pick-up coils of output signals denoting the relative movement between the members.

8 Claims, 1 Drawing Figure

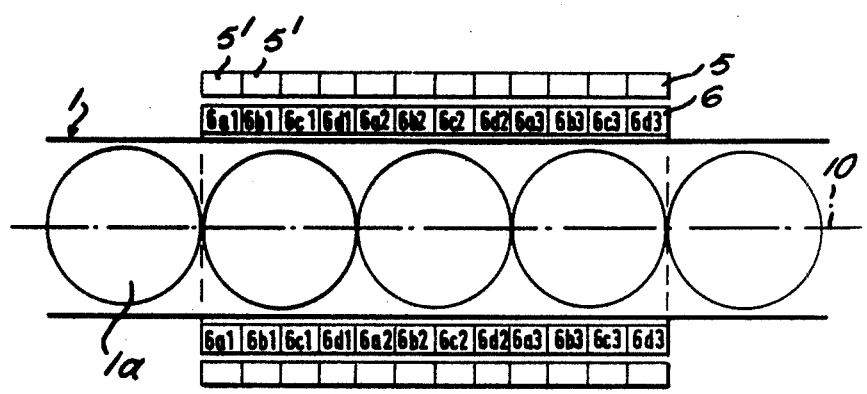

PHASE DISPLACED MEASUREMENT OF CONTIGUOUS SPHERICAL BALLS

This invention relates to a detector for measuring relative movement and/or displacement.

According to the invention, there is provided a detector comprising a plurality of regularly shaped elements of magnetic material which are periodically located along a path, and a transducer which is movable relative to said elements in a direction parallel to the path of the elements, the transducer comprising a transmitter coil, or series of coils, disposed for producing a magnetic field in a direction along said path, and at least two pick-up coils which embrace said path and are displaced along it, the relative locations of the pick-up coils and the elements enabling, on energisation of the transmitter coil or coils, the production by the pick-up coils of signals denoting the said relative movement.

The pick-up coils may be coaxial with the transmitter coil. Additionally or alternatively, the transmitter coil may be co-axial with said path. Each pick-up coil may comprise a number of coil portions which are connected in series and which are located at regular intervals along the path corresponding to the pitch of the elements, each coil portion of each pick-up coil being adjacent the corresponding coil portion of an adjacent pick-up coil. The transmitter coil may comprise a plurality of coil portions. The total number of transmitter coil portions may be equal to the total number of pick-up coil portions, each transmitter coil portion surrounding a respective one of the pick-up coil portions. The transducer may comprise a multiplicity of pick-up coils, the relative positions of the adjacent coil portions of which being determined by the number of pick-up coils provided.

The elements may be balls, preferably spherical, which may be made of steel, and which are preferably placed side by side in contact along said path. The balls are preferably constrained so that they cannot move relative to each other, and may be housed in a container such as a tube or mounted on a support of non-magnetic material, so that the said path is straight.

In practice, the elements are connected to a first part of a machine of which the displacement relative to a second part of the machine due to relative movement therebetween is to be measured, and the transducer is mounted on the second part of the machine. Either of the parts of the machine may be stationary whilst the other one moves, or both may move in different directions or at different speeds, so long as there is some relative displacement in a direction to the path of magnetic elements.

Reference will now be made to the accompanying drawing, of which the sole FIGURE illustrates diagrammatically, by way of example, a detector according to one embodiment of the present invention, which includes four pick-up coils.

In the drawing a plurality of steel spherical balls $1a$ are arranged in a suitable housing 1 side by side in contact with each other in a straight line. A transducer 5, 6 is located around the balls $1a$, the transducer comprising a transmitter coil 5 and pick-up coils 6 which are co-axial with the transmitter coil and also co-axial with a line 10 joining the centres of the balls. The balls and the transducer are relatively movable in directions parallel to the line 10, being mounted on respective parts (not shown) of a machine which are also relatively movable in directions parallel to the line 10, and it is the relative displacement of these two machine parts which is to be measured.

The transmitter coil 5 comprises a number of transmitter coil portions 5', connected in series, the centre of each coil portion being spaced a distance $d/n$ where $d$ is the diameter or pitch of the balls $1a$ and $n$ is the number of pick-up or receiver coils 6. In this embodiment, four pick-up coils $6a$, $6b$, $6c$ and $6d$ are provided (i.e. $n = 4$). Each pick-up coil, for example $6a$, comprises a number of pick-up coil portions, for example $6a\,1$, $6a\,2$, $6a\,3$ etc. which are spaced apart at intervals of length $d$. Each pick-up coil portion is surrounded by a respective transmitter coil portion 5', so that the centres of adjacent pick-up coil portions are spaced by $d/4$. Thus, as the pick-up coils are interleaved, the centre of pick-up coil portions $6a\,1$, for example, is spaced by $d/4$ from the centre of pick-up coil portion $6b\,1$.

The transmitter coil is supplied with a signal of periodic waveform, e.g. sinusoidal, rectangular, etc. which produces a magnetic field parallel to the line 10. The variation in the magnetic field resulting from relative axial movement between the balls $1a$ and the transducer produces corresponding variations in the signals induced in each pick-up coil $6a$, $6b$, $6c$ or $6d$. The phase of the output signals from the pick-up coils is then adjusted in correspondence with the relative pitch displacement of the pick-up coils. Thus when the output signals are summed, after filtering where necessary, the resultant signal is a constant amplitude, sinusoidal waveform of which the phase is directly proportional to the relative displacement due to the relative movement of the machine parts.

Alternatively, the transmitter coil portions which surround the coil portions of each respective pick-up coil may be connected in series, and a separate signal supplied to each group of transmitter coil portions, the relative phases of the signals supplied corresponding to the pitch displacement of the respective associated pick-up coil. In this case, no phase adjustment of the pick-up coil output signals is required.

It should be noted that it is possible for the coil portions of the pick-up and transmitter coils of this embodiment to be produced on flexible printed circuits which are wrapped around the ball housing.

We claim:

1. A position detector comprising a first member, a row of contiguous spherical balls of magnetizable material carried by said first member and disposed in side by side point contact and constrained against movement relative to one another, a second member, a transducer carried by said second member, said first and second members being relatively movable in a direction parallel to the row of balls and to the line of contact thereof, and said transducer comprising means for producing a periodically varying magnetic field through the balls in a direction extending along the line of point contact and means for sensing phase-displaced variations produced in the magnetic field by said relative movement and for producing signals denoting the relative positions of the first and second members, said sensing means comprising at least two pick-up coils which are spaced apart along the row of balls and the line of point contact thereof and through which the balls pass.

2. A position detector as claimed in claim 1, in which the means for producing a periodically varying magnetic field comprises at least one transmitter coil.

3. A position detector as claimed in claim 1, in which the means for producing a periodically varying magnetic field comprises at least one transmitter coil which is coaxial with the pick-up coils.

4. A position detector as claimed in claim 3, in which the transmitter coil is coaxial with the row of balls.

5. A position detector as claimed in claim 1 in which each pick-up coil comprises a number of pick-up coil portions which are connected in series and which are located at regular intervals along the row of balls, the length of said intervals being related to the diameter of the balls, each pick-up coil portion of pick-up coil being adjacent to the corresponding pick-up coil portion of an adjacent pick-up coil.

6. A position detector as claimed in claim 5, in which the means for producing a periodically varying magnetic field comprises at least one transmitter coil, each transmitter coil comprising a plurality of transmitter coil portions.

7. A position detector as claimed in claim 6, in which the total number of transmitter coil portions, is equal to the total number of pick-up coil portions, each transmitter coil portion being coaxial with and surrounding a respective one of the pick-up coil portions.

8. A position detector as claimed in claim 7, in which the transducer comprises a multiplicity of pick-up coils, the interval between adjacent pick-up coil portions of each pick-up coil being determined by the number of pick-up coils provided.

* * * * *